(12) United States Patent
Lee et al.

(10) Patent No.: US 7,657,279 B2
(45) Date of Patent: Feb. 2, 2010

(54) APPARATUS AND METHOD FOR TRANSMITTING INFORMATION FOR MBMS

(75) Inventors: Young Dae Lee, HaNam-shi (KR); Sung Duck Chun, Anyang (KR); Myung Cheul Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 721 days.

(21) Appl. No.: 11/333,900

(22) Filed: Jan. 17, 2006

(65) Prior Publication Data

US 2006/0183498 A1 Aug. 17, 2006

(30) Foreign Application Priority Data

Feb. 14, 2005 (KR) .................... 10-2005-0012071

(51) Int. Cl.
*H04Q 7/20* (2006.01)
(52) U.S. Cl. .................... 455/522; 455/500; 455/517; 455/414.1; 455/414.2; 455/432.1; 370/328; 370/329; 370/338; 370/343
(58) Field of Classification Search ............. 455/522, 455/69, 127.1, 436–444, 422.1, 403, 426.1, 455/426.2, 414.1–414.4, 550.1, 500, 517, 455/515, 445, 432.1, 432.2, 552.1, 450, 452.1, 455/451, 509; 370/328, 329, 338, 343
See application file for complete search history.

(56) References Cited

U.S. PATENT DOCUMENTS

| 2003/0076803 | A1* | 4/2003 | Chuah .................... 370/338 |
| 2006/0034225 | A1 | 2/2006 | Jung et al. |
| 2006/0154627 | A1* | 7/2006 | Wang et al. ............... 455/130 |
| 2006/0166653 | A1* | 7/2006 | Xu et al. ................ 455/412.2 |
| 2006/0285512 | A1* | 12/2006 | Lee et al. .................. 370/328 |
| 2007/0105557 | A1* | 5/2007 | Israelsson et al. .......... 455/436 |

FOREIGN PATENT DOCUMENTS

| KR | 2005-7823 A | 1/2005 |
| KR | 2006-26722 A | 3/2006 |
| WO | 2004/017580 A1 | 2/2004 |
| WO | 2004/028179 A1 | 4/2004 |

* cited by examiner

*Primary Examiner*—Keith T Ferguson
(74) *Attorney, Agent, or Firm*—Lee, Hong, Degerman, Kang & Waimey

(57) ABSTRACT

An apparatus and method for transmitting information for a Multimedia Broadcast/Multicast Service (MBMS) is provided that facilitates a mobile communication device receiving a specific MBMS without any difficulty when the device moves from one area to another area. By providing MBMS status information to a controller in the area from which the device moved, the controller in the area from which the device moved can either establish an additional channel to provide the MBMS to the device or initiate a relocation of control of the device to a controller in the area into which the device has moved.

45 Claims, 5 Drawing Sheets

APPARATUS AND METHOD FOR TRANSMITTING INFORMATION FOR MBMS

CROSS-REFERENCE TO RELATED APPLICATIONS

Pursuant to 35 U.S.C. § 119(a), this application claims the benefit of earlier filing date and right of priority to Korean Application No. P05-012071, filed Feb. 14, 2005, the contents of which is hereby incorporated by reference herein in its entirety

BACKGROUND OF THE INVENTION

1. Field of the Invention

The present invention relates to a multimedia broadcast/multicast service (MBMS), and particularly, to an apparatus and method for transmitting information for supporting mobility of a terminal and providing an MBMS.

2. Description of the Related Art

Figure 1:
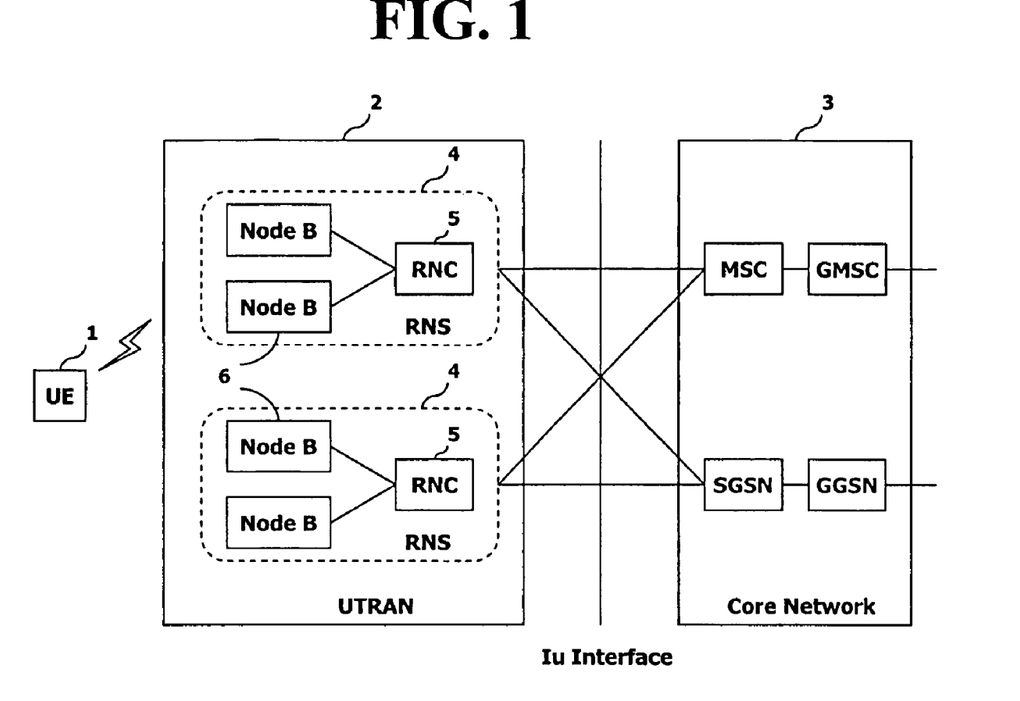
FIG. 1 illustrates a network structure of a UMTS system to which the conventional art and the present invention are applied.

A universal mobile telecommunications system (UMTS) is a third generation mobile communications system that has evolved from a specification known as the European Global System for Mobile communications (GSM) system which aims to provide an improved mobile communications service based on a GSM core network and a wideband code division multiple access (W-CDMA) technology. FIG. 1 illustrates a network structure of a UMTS system to which the conventional art and the present invention are applied.

As illustrated in FIG. 1, the UMTS system is broadly comprised of a terminal, or user equipment (UE), a UTRAN 2 and a Core Network (CN) 3. The UTRAN 2 includes more than one Radio Network Sub-system (RNS) 4, each of which includes a single Radio Network Controller (RNC) 5 and more than one Node B 6 managed by the RNC. The RNC 5 manages the Node B 6, which serves as an access point of the UTRAN 2 for the terminal by receiving information transmitted from a physical layer of the terminal over an uplink and transmitting data to the terminal 1 over a downlink. The RNC 5 allocates and manages radio resources, and serves as an access point of the CN 3.

Figure 2:
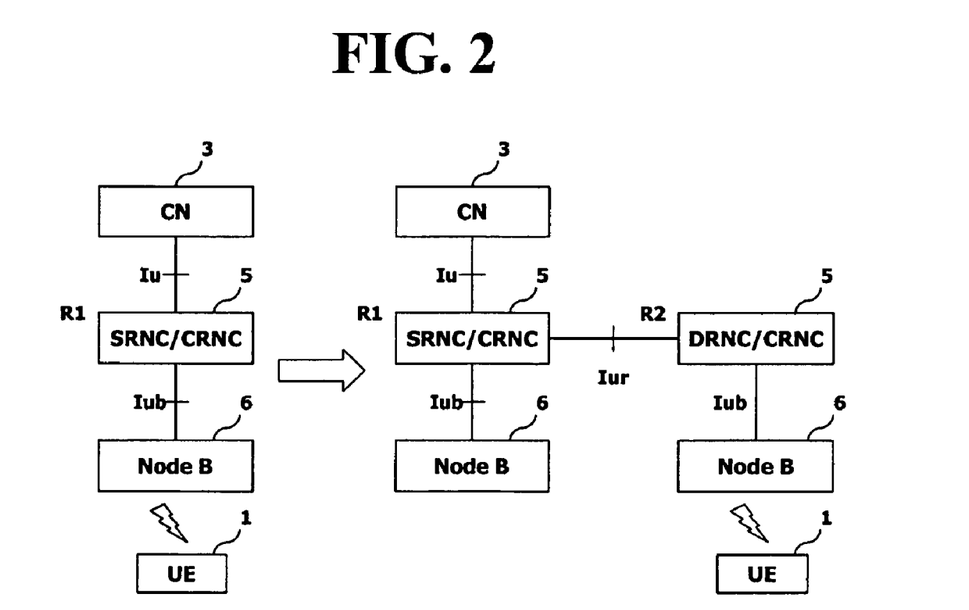
FIG. 2 illustrates a connection structure between a UTRAN and a terminal within a UMTS network.

FIG. 2 illustrates a connection structure between the UTRAN 2 and the terminal 1 within the UMTS network. As illustrated in FIG. 2, the terminal 1 is connected with the CN 3 in order to receive services provided from the UMTS and information of the terminal and the CN is transmitted via the UTRAN 2.

The CN 3 is connected to the RNC 5 through an Iu interface in order to transmit and receive data and control messages. Each terminal 1 connected to the UMTS network is managed by a specific RNC 5 within the UTRAN 2. A Serving RNC (SRNC) 5 is the RNC for managing terminals. In other words, the SRNC 5 refers to the RNC that serves as the access point with the CN 3 for transmitting data to a specific terminal 1.

The SRNC 5 performs as a second layer of an Open System Interface (OSI) for data coming through a radio interface or being transmitted to the terminal and allocates radio resources appropriate to provide services. The function of managing radio resources performed by the SRNC 5 includes control functions associated with the specific terminal 1, such as setting transport channels, determining a handover and performing an Open Loop Power Control. The terminal 1 connected to the CN 3 through the UTRAN 2 at a specific time point has only one SRNC 5.

In general, one RNC 5 is used between the terminal 1 and the CN 3. However, if the terminal 1 moves to a new area managed by another RNC 5, the terminal is connected to the RNC at the new area via the RNC of the previous area.

For instance, it is assumed that the terminal is initially connected to the CN 3 through R1 (RNC1), but the terminal moves to an area or cell managed by R2 (RNC2). After moving to the area managed by R2, the terminal 1 is connected to R1 through an Iur interface via R2. R1 manages the terminal and serves as an access point with the CN 3 and R2 partially performs functions of routing user data or allocating codes, specifically, common resources. In the UMTS network, every RNC 5 connected to the terminal 1, such as R2, other than the SRNC is referred to as a Drift RNC (DRNC). Therefore, one terminal 1 may have no DRNC 5 or may have one or several DRNCs according to its connection state.

The SRNC 5 and the DRNC are logically divided with relation to a specific terminal 1. However, the RNC 5 and the Node B 6 within the UTRAN 2 have a subordinate relation there between and, accordingly, the RNC can be divided at the side of the Node B. In order to distinguish between the RNC 5 managing the Node B 6 and other RNCs, an RNC managing a specific Node B is referred to as a Controlling RNC (CRNC). Specifically, the RNC 5 that is connected to a specific Node B 6 via an Iub and controls radio resources of the Node B corresponds to the CRNC of the specific Node B and there is a one-to-many relation between the CRNC and the Node B in the structure of the UTRAN 2. The CRNC 5 performs functions such as load control and congestion control of traffic within a cell that the CRNC manages, acceptance control for a new radio link set within this cell and code allocation.

A Radio Resource Control (RRC) layer is defined at a third layer of a radio protocol located in the RNC 5 and the terminal 1. The RRC handles the controlling of transport channels and physical channels related to establishment, reconfiguration, and release of Radio Bearers (RBs). An RB denotes the services provided by a second layer of the radio protocol for data transmissions between the terminal 1 and the RNC 5. In general, establishing the RB denotes the processes of stipulating the characteristics of a protocol layer and a channel, which are required for providing a specific service, and setting the respective detailed parameters and operation methods thereof.

The RRC state refers to whether the RRC of the terminal 1 is logically connected to the RRC of the UTRAN 2, thereby forming a logical connection with the RRC of the UTRAN. If the RRC of the terminal 1 forms a logical connection with the RRC of the UTRAN 2, this is referred to as an RRC connected state. Conversely, if there is no logical connection between the RRC of the terminal 1 and the RRC of the UTRAN 2, this is referred to as an RRC idle state.

When the terminal 1 is in the RRC connected state and, accordingly, the UTRAN 2 can recognize the existence of the corresponding terminal according to units of cells, the UTRAN can effectively control the terminal. On the other hand, the UTRAN 2 cannot recognize a terminal 1 that is in idle state. The terminal 1 in idle state can be managed by the CN 3 according to units of location areas or units of routing areas, which are areas larger than the cell. Specifically, the existence of a terminal 1 in idle state is only recognized according to units of large areas, such as location areas or routing areas, and the terminal must transition into the connected state in order to receive typical mobile communication services such as voice or data.

Figure 3:
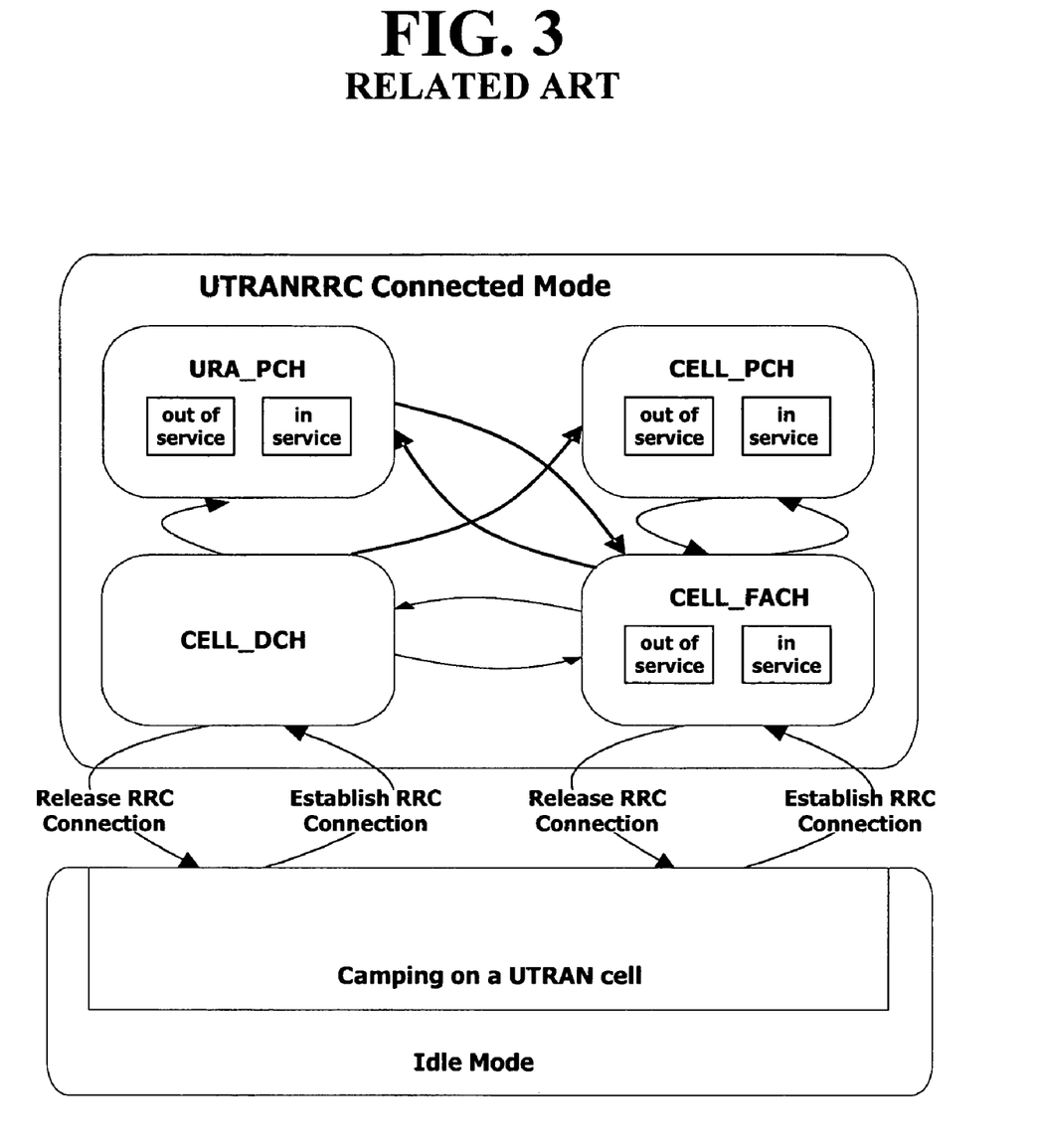
FIG. 3 illustrates an RRC state transition of a terminal.

FIG. 3 illustrates an RRC state transition of a terminal 1. As illustrated in FIG. 3, when a user turns on the power of the terminal 1, the terminal first detects an appropriate cell and maintains its idle state in the corresponding cell. The terminal 1 in idle state forms an RRC connection with the RRC of the UTRAN 2 through the RRC connection procedure and transitions into the RRC connected state when the RRC connection needs to be formed.

There are several instances in which a terminal 1 in idle state is required to form the RRC connection. For example, an uplink data transmission may be required due to a call attempt by a user or the transmission of a response message in response to a paging message received from the UTRAN 2 may be required.

A Multimedia Broadcast/Multicast Service (MBMS) refers to a service for providing streaming or background services to a plurality of terminals 1 using a downlink dedicated MBMS bearer service. In the UTRAN 2, the MBMS bearer uses a point-to-multipoint radio bearer (RB) and a point-to-point RB.

The MBMS is divided into a broadcast mode and a multicast mode. The MBMS broadcast mode is a service for transmitting multimedia data to all users within a broadcast area. The broadcast area refers to a region where the broadcast service is possible. Conversely, the MBMS multicast mode is a service for transmitting the multimedia data only to a specific user group within a multicast area. The multicast area refers to a region where the multicast service is possible. The multimedia area and broadcast area are referred to as a service area.

Figure 4:
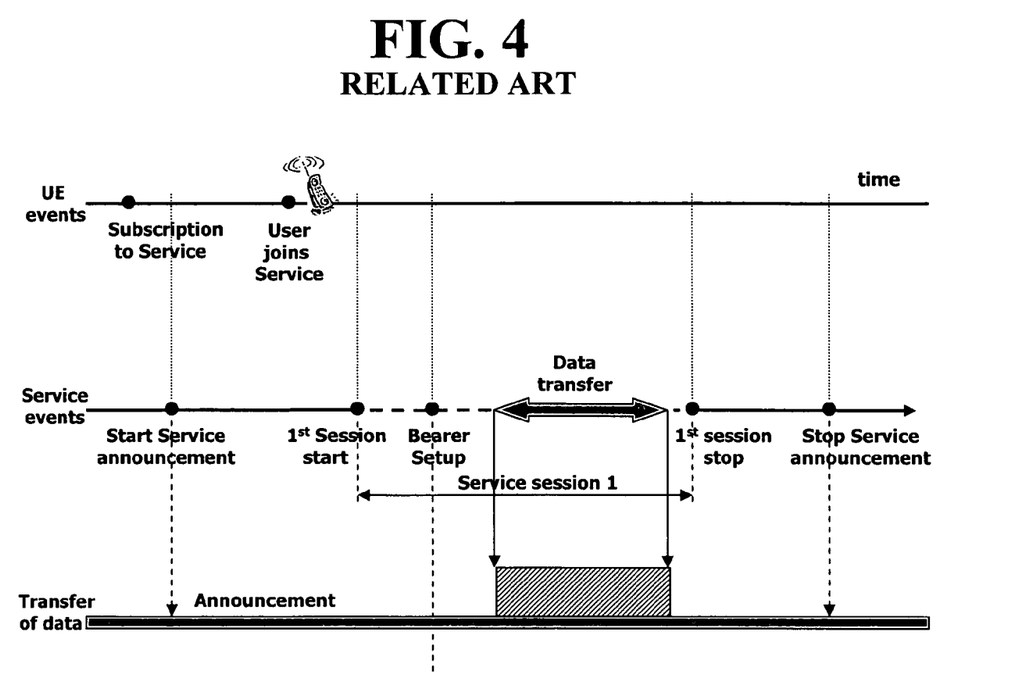
FIG. 4 illustrates an embodiment in which a conventional UMTS network provides a specific MBMS to a UE using a multicast mode.

FIG. 4 illustrates a conventional procedure for providing a specific MBMS (service 1) from a UMTS network to a terminal (UE) 1 by using a multicast mode. A UE 1 that desires to receive an MBMS subscribes to the service, a process referred to as subscription. Subscribing refers to establishing a relationship between a service provider and a user.

Terminals 1 desiring to receive the MBMS should receive a service announcement provided by the network 3. The service announcement refers to providing to the terminal 1 an index and any related information of the services to be provided. Specifically, a terminal 1 desiring to receive the MBMS of the multicast mode should join a multicast group. The multicast group refers to a group of terminals 1 receiving a specific multicast service and joining refers to one user merging with the other users in a multicast group to receive the particular multicast service.

The terminal 1 can inform the UMTS network that it desires to receive specific multicast data through MBMS multicast joining. Conversely, a procedure whereby a terminal 1, having joined a specific multicast group, is no longer a part of the multicast group is referred to as leaving. Each terminal 1 performs the subscribing, joining and leaving processes. The terminal 1 can perform the subscribing, joining, and leaving processes at various times, such as before data transmission, during the transmission, or after the transmission.

While a specific MBMS is ongoing, one or more sessions can sequentially be generated with respect to the corresponding service. If data to be transmitted for the specific MBMS is generated in an MBMS source, the CN 3 notifies the RNC 5 of the start of a session. Conversely, when there is no more data to be transmitted for the specific MBMS in the MBMS source, the CN 3 notifies the RNC 5 of a session stop. The data transmission with respect to the specific MBMS can be carried out between the session starting and the session stop. The data transmitted through the data transmission process can be transmitted only to the terminals 1 having joined the multicast group for the specific MBMS.

In the session starting process, the RNC 5, having received the session starting from the CN 3, transfers an MBMS notification to the terminals. The MBMS notification refers to the RNC 5 informing a terminal 1 that the data transmission of the specific MBMS in a cell draws near or is impending. The MBMS notification is transmitted more than one time before actual data of the service is transmitted. The RNC 5 may also count the number of terminals receiving the specific MBMS within one specific cell using the MBMS notification process. The counting procedure is used for determining whether a point-to-multipoint RB or a point-to-point RB should be set as the RB for transmitting the specific MBMS, or whether no RB should be set.

The RNC 5 internally establishes a threshold value to select an appropriate MBMS RB. After the RNC 5 counts the number of terminals 1, if the counted number of terminals existing within the corresponding cell is smaller than the threshold value, the RNC establishes a point-to-point RB, while a point-to-multipoint RB is established if the counted number of terminals is greater than the threshold value. After determining the MBMS RB, the RNC 5 informs the terminals 1 of the establishment information of the corresponding RB.

When the point-to-point RB is established for the specific service, the terminals 1 desiring to receive the service are all in the RRC connected state. However, when the point-to-multipoint RB is established for the specific service, all terminals 1 desiring to receive the service do not have to be in the RRC connected state. That is, terminals 1 in an idle state can also receive the MBMS data by using the point-to-multipoint RB. When MBMS data is transmitted from the CN 3 during one session of the MBMS, the RNC 5 initiates data transmission using the established RB, and releases the pre-established RB when the CN transmits a session stopping message.

However, if there is no terminal 1 that desires to receive the specific MBMS, the RNC 5 does not establish any RB and does not transmit the MBMS data. Establishing an RB by the RNC 5 even if there is no user who wants to receive the service would cause undesirable consumption of radio resources.

The MBMS area refers to an area configured with cells supporting MBMSs to which a specific terminal 1 has subscribed. The MBMS area is constructed by combining more than one cell, and may be constructed with cells managed by one RNC 5 or be located over areas managed by several RNCs. A list of neighboring cell information refers to a list including information of cells managed by the DRNC 5 that is positioned adjacent to the RNC.

Figure 5:
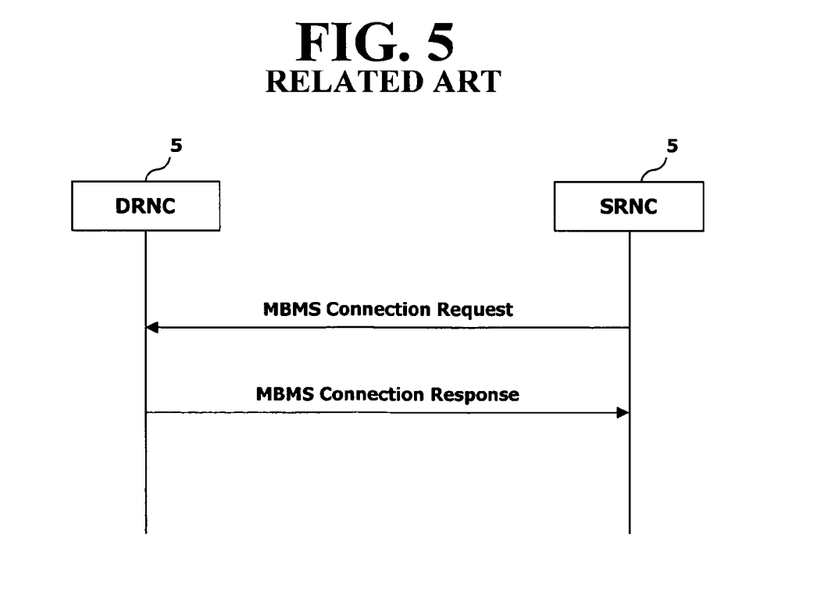
FIG. 5 illustrates a conventional MBMS attaching procedure.

FIG. 5 illustrates an MBMS attaching procedure. As illustrated in FIG. 5, the RNC 5 providing an MBMS recognizes and manages a terminal 1 in the RRC connected state among terminals having joined a specific MBMS for every cell that the RNC manages. The RNC 5 makes a list, such as an RRC connected terminal list, of terminals 1 in the RRC connected state for each MBMS of each cell. The RRC connected terminal list includes identifiers, such as URNTI, of the terminals 1 having joined the specific MBMS.

As part of the MBMS attaching procedure, when the terminal 1 has moved from a cell managed by the SRNC 5 into a cell managed by the DRNC, the SRNC receives a session start message from the CN 3 with respect to an MBMS that a terminal in the RRC connected state has joined, both for those services that are ongoing and those services that are not ongoing. Thereafter, the SRNC 5 transmits terminal information to the DRNC through an MBMS connection or attachment request message, such that the DRNC adds terminals 1 which request the MBMS connection to the RRC connected terminal list that the DRNC manages. The MBMS connection request message includes an ID of a cell to which the terminal 1 has moved, IDs of any MBMS that the terminal is joining and the URNTI of the terminal.

Once the MBMS connection or attachment request message for a specific terminal 1 is received from the SRNC 5, if it is possible to allocate resources for maintaining the RRC connected state with respect to the corresponding terminal. The DRNC 5 grants the MBMS connection request of the terminal 1. The DRNC 5 then adds the URNTI of the terminal 1 to the RRC connected terminal list for each MBMS that the moved terminal has joined.

The DRNC 5 then transmits a positive response to the SRNC through an MBMS connection response message. The SRNC 5, having received the message, maintains the terminal 1 in the RRC connected state even in the new cell. The SRNC 5 also transmits the MBMS data to the terminal 1 using a point-to-point RB. Specifically, the MBMS data is transmitted to the DRNC 5 through the SRNC and then transmitted to the terminal 1 through the DRNC using the point-to-point RB.

The DRNC 5 does not always grant the MBMS connection request upon receiving the MBMS connection request message for the specific terminal 1 from the SRNC. If the DRNC 5 forms the RRC connection for the terminal 1 but there are no resources for maintaining the terminal in the RRC connected state, the DRNC denies the MBMS connection request of the terminal and transmits a negative response to the SRNC.

However, in the conventional art, if a terminal 1 located outside each MBMS area is connected to the DRNC 5, problems may occur. When the terminal 1 has moved to the MBMS area managed by the DRNC 5 that provides an MBMS to which the terminal has subscribed, the moved terminal obtains information of the corresponding service by receiving a notification from the DRNC or receives information of the MBMS through a MBMS Control Channel (MCCH).

At this time, the MBMS can be transmitted using a point-to-point RB or a point-to-multipoint RB. When the DRNC 5 provides the MBMS using the point-to-point RB, the terminal 1 should receive the MBMS directly from the SRNC instead of from the SRNC via the DRNC by setting a dedicated channel. However, it is impossible for the SRNC 5 to accurately recognize whether the DRNC is providing the MBMSs to which the terminal 1 has subscribed or that the MBMSs are being provided using the point-to-point RB.

Accordingly, the SRNC 5 cannot set the dedicated channel for the terminal 1 to receive the MBMS using the point-to-point RB and, therefore, the terminal cannot receive the MBMS. Specifically, when a terminal 1 has moved from an area managed by the SRNC 5 to an area managed by DRNC and has been connected to the DRNC, even though the MBMS to which the terminal has subscribed is being transmitted through the point-to-point RB via the DRNC, the SRNC can not accurately recognize the state of the MBMS in the DRNC and the SRNC cannot set the dedicated channel with the terminal. As a result, the terminal 1 cannot receive the MBMS.

Therefore, there is a need for an apparatus and method for transmitting information for supporting mobility of a terminal and providing an MBMS. The present invention addresses these and other needs.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The invention is directed to provide an apparatus and method for transmitting information for supporting mobility of a terminal and providing an MBMS. By transmitting status information related to an MBMS from a radio network controller that controls an area into which a terminal has moved to a radio network controller that controls the area from which the terminal has moved and the radio network controller that controls the area from which the terminal has moved either establishes a point-to-point channel to provide the MBMS to the terminal or initiates a relocation of control of the terminal to radio network controller that controls the area into which a terminal has moved, a terminal may receive the MBMS when moving from one area to another.

In one aspect of the present invention, a method for providing a point-to-multipoint service to at least one mobile communication terminal in a mobile communications system when the terminal moves from a first area controlled by a first controller to a second area controlled by a second controller is provided. The method includes transmitting to the first controller status information related to the point-to-multipoint service provided by the second controller and the first controller either establishing a channel to transmit the point-to-multipoint service to the at least one mobile communication terminal or initiating a relocation of the control of the at least one mobile communication terminal to the second controller.

It is contemplated that the point-to-multipoint service is a Multimedia Broadcast/Multicast Service (MBMS). Preferably, the channel established by the first controller to transmit the point-to-multipoint service to the at least one mobile communication terminal is a dedicated channel.

It is contemplated that the first controller is a serving radio network controller (SRNC) and the second controller is a drift radio network controller (DRNC). It is further contemplated that the first controller establishes a channel to transmit the point-to-multipoint service to the at least one mobile communication terminal if the first controller supports the point-to-multipoint service and the first controller initiates a relocation of the control of the at least one mobile communication terminal to the second controller if the first controller does not support the point-to-multipoint service.

It is contemplated that the mobile communication terminal transmits the status information. Preferably, the method further includes the mobile communication terminal determining that the point-to-multipoint service is provided via a dedicated channel by the second controller, the mobile communication setting a timer and the mobile communication terminal either terminating the timer upon receiving the point-to-multipoint service via a channel established by the first controller or transmitting the status information upon expiration of the timer. Preferably, the second controller transmits the status information.

It is contemplated that the method further includes the second controller transmitting the status information to at least a third controller in addition to the first controller, the third controller adjacent to the second controller. Preferably, the status information is transmitted via an MBMS connection message, a channel type reconfiguration message, a radio link setup message, a radio link reconfiguration message or an RRC signaling message.

It is contemplated that the status information includes a service ID of the point-to-multipoint service. Preferably, the method further includes the second controller determining that the service ID does not correspond to a service predetermined as provided via a dedicated channel and the second controller transmitting the status information including a type of radio bearer established for providing the point-to-multipoint service.

In another aspect of the present invention, a method for providing a point-to-multipoint service to at least one mobile communication terminal in a radio communications system when the terminal moves from a first area controlled by a first controller to a second area controlled by a second controller is provided. The method includes receiving status information related to the point-to-multipoint service provided by the second controller and either establishing a channel to transmit the point-to-multipoint service to the at least one mobile communication terminal or initiating a relocation of the control of the at least one mobile communication terminal to the second controller.

It is contemplated the point-to-multipoint service is a Multimedia Broadcast/Multicast Service (MBMS). Preferably, the channel established to transmit the point-to-multipoint service to the at least one mobile communication terminal is a dedicated channel.

It is contemplated that the first controller is a serving radio network controller (SRNC). Preferably, a channel is established to provide the point-to-multipoint service if the point-to-multipoint service is supported and a relocation of the control of the at least one mobile communication terminal to the second controller is initiated if the point-to-multipoint service is not supported.

It is contemplated that receiving the status information includes receiving either an MBMS connection message, a channel type reconfiguration message, a radio link setup message, a radio link reconfiguration message or an RRC signaling message. It is contemplated that the status information including a service ID of the point-to-multipoint service. Preferably, the status information further includes a type of radio bearer established by the second controller for providing the point-to-multipoint service.

In another aspect of the present invention, a method for providing a point-to-multipoint service to at least one mobile communication terminal in a mobile communications system when the terminal moves from a first area controlled by a first controller to a second area controlled by a second controller is provided. The method includes transmitting status information related to the point-to-multipoint service provided and either receiving a channel from the first controller to transmit the point-to-multipoint service to the at least one mobile communication terminal or assuming control of the at least one mobile communication terminal.

It is contemplated that the point-to-multipoint service is a Multimedia Broadcast/Multicast Service (MBMS). Preferably, the channel received to transmit the point-to-multipoint service to the at least one mobile communication terminal is a dedicated channel.

It is contemplated that the second controller is a drift radio network controller (DRNC). Preferably, the method further includes transmitting the status information to the first controller and at least a third controller, the third controller adjacent to the second controller.

It is contemplated that transmitting the status information includes transmitting either an MBMS connection message, a channel type reconfiguration message, a radio link setup message, a radio link reconfiguration message or an RRC signaling message. It is further contemplated that transmitting the status information includes transmitting a service ID of the point-to-multipoint service. Preferably, transmitting the status information further includes determining that the service ID does not correspond to a service predetermined as provided via a dedicated channel and transmitting the status information including a type of radio bearer established for providing the point-to-multipoint service.

In another aspect of the present invention, a method for providing a point-to-multipoint service to at least one mobile communication terminal in a mobile communications system when the terminal moves from a first area controlled by a first controller to a second area controlled by a second controller is provided. The method includes transmitting status information related to the point-to-multipoint service provided by the second controller and receiving the point-to-multipoint service.

It is contemplated that the point-to-multipoint service is a Multimedia Broadcast/Multicast Service (MBMS). Preferably, the method further includes determining that the point-to-multipoint service is provided via a dedicated channel by the second controller, setting a timer and either terminating the timer upon receiving the point-to-multipoint service or transmitting the status information upon expiration of the timer.

In another aspect of the present invention, a method for providing a point-to-multipoint service to a plurality of mobile communication terminals in a mobile communications system when at least a first and a second of the plurality of terminals move from a first area controlled by a first controller to a second area controlled by a second controller is provided. The method includes transmitting status information to the first controller when the first of the plurality of terminals moves from the first area to the second area, the status information related to the point-to-multipoint service provided by the second controller, the first controller establishing a first channel to transmit the point-to-multipoint service to the first of the plurality of mobile communication terminals and the first controller establishing a second channel to transmit the point-to-multipoint service to the second of the plurality of mobile communication terminals without receiving the status information when the second of the plurality of terminals moves from the first area to the second area.

It is contemplated that the point-to-multipoint service is a Multimedia Broadcast/Multicast Service (MBMS). Preferably, the first controller is a serving radio network controller (SRNC) and the second controller is a drift radio network controller (DRNC).

It is contemplated that the mobile communication terminal transmits the status information. It is further contemplated that the method further includes the mobile communication terminal determining that the point-to-multipoint service is provided via a dedicated channel by the second controller, the mobile communication terminal setting a timer and the mobile communication terminal either terminating the timer upon receiving the point-to-multipoint service via a dedicated channel established by the first controller or transmitting the status information upon expiration of the timer. Preferably, the second controller transmits the status information.

It is contemplated that the method further includes the second controller transmitting the status information to at least a third controller in addition to the first controller, the third controller adjacent to the second controller. Preferably, the status information is transmitted via either an MBMS connection message, a channel type reconfiguration message, a radio link setup message, a radio link reconfiguration message or an RRC signaling message.

It is contemplated that the status information includes a service ID of the point-to-multipoint service. It is further contemplated that the method further includes the second controller determining that the service ID does not correspond to a service predetermined as provided via a dedicated channel and the second controller transmitting the status information including a type of radio bearer established for providing the point-to-multipoint service.

In another aspect of the present invention, a method for providing a point-to-multipoint service to a plurality of mobile communication terminals in a mobile communications system when at least a first and a second of the plurality of terminals move from a first area controlled by a first controller to a second area controlled by a second controller is provided. The method includes receiving status information when the first of the plurality of terminals moves from the first area to the second area, the status information related to the point-to-multipoint service provided by the second controller, establishing a channel to provide the point-to-multipoint service to the first of the plurality of mobile communication terminals and establishing a channel to provide the point-to-multipoint service to the second of the plurality of mobile communication terminals without receiving the status information when the second of the plurality of terminals moves from the first area to the second area.

It is contemplated that the point-to-multipoint service is a Multimedia Broadcast/Multicast Service (MBMS). Preferably, the first controller is a serving radio network controller (SRNC).

It is contemplated that receiving the status information includes receiving either an MBMS connection message, a channel type reconfiguration message, a radio link setup message, a radio link reconfiguration message or an RRC signaling message. It is further contemplated that the status information includes a service ID of the point-to-multipoint service. Preferably, the status information further includes a type of radio bearer established by the second controller for providing the point-to-multipoint service.

In another aspect of the present invention, a method for providing a point-to-multipoint service to a plurality of mobile communication terminals in a mobile communications system when at least a first and a second of the plurality of terminals move from a first area controlled by a first controller to a second area controlled by a second controller is provided. The method includes transmitting status information when the first of the plurality of terminals moves from the first area to the second area, the status information related to the point-to-multipoint service provided and not transmitting the status information when the second of the plurality of terminals moves from the first area to the second area.

It is contemplated that the point-to-multipoint service is a Multimedia Broadcast/Multicast Service (MBMS). Preferably, the second controller is a drift radio network controller (DRNC).

It is contemplated that the method further includes transmitting the status information to the first controller and at least a third controller adjacent to the second controller. Preferably, transmitting the status information includes transmitting either an MBMS connection message, a channel type reconfiguration message, a radio link setup message, a radio link reconfiguration message or an RRC signaling message.

It is contemplated that transmitting the status information includes transmitting a service ID of the point-to-multipoint service. Preferably, transmitting the status information further includes determining that the service ID does not correspond to a service predetermined as provided via a dedicated channel and transmitting a type of radio bearer established for providing the point-to-multipoint service.

In another aspect of the present invention, a method for providing a point-to-multipoint service to a plurality of mobile communication terminals in a mobile communications system when at least a first and a second of the plurality of terminals move from a first area controlled by a first controller to a second area controlled by a second controller is provided. The method includes transmitting status information if the mobile communication terminal is the first of the plurality of terminals and not the transmitting status information if the mobile communication terminal is the second of the plurality of terminals, the status information related to the point-to-multipoint service and receiving the point-to-multipoint service.

It is contemplated that the point-to-multipoint service is a Multimedia Broadcast/Multicast Service (MBMS). Preferably, the method further includes determining that the point-to-multipoint service is provided via a dedicated channel by the second controller, setting a timer and either terminating the timer upon receiving the point-to-multipoint service via a dedicated channel or transmitting the status information upon expiration of the timer.

In another aspect of the present invention, a network controller for providing a point-to-multipoint service to at least one mobile communication terminal in a radio communications system when the terminal moves from an area controlled by the network controller to an area controlled by a second controller is provided. The network controller includes a transmitter adapted to transmit signals including the point-to-multipoint service to the at least one mobile communication terminal, a receiver adapted to receive signals including status information related to the point-to-multipoint service provided by the second controller and a processor adapted to process the status information and either establish a channel to transmit the point-to-multipoint service to the at least one mobile communication terminal or initiate a relocation of the control of the at least one mobile communication terminal to the second controller.

It is contemplated that the point-to-multipoint service is a Multimedia Broadcast/Multicast Service (MBMS). Preferably, the channel established to transmit the point-to-multipoint service to the at least one mobile communication terminal is a dedicated channel.

It is contemplated that the network controller is a serving radio network controller (SRNC). Preferably, the processor is further adapted to establish a channel to provide the point-to-multipoint service if the point-to-multipoint service is supported and to initiate a relocation of the control of the at least one mobile communication terminal to the second controller if the point-to-multipoint service is not supported.

It is contemplated that the processor is further adapted to process either an MBMS connection message, a channel type reconfiguration message, a radio link setup message, a radio link reconfiguration message or an RRC signaling message including the status information. It is further contemplated that the status information comprises a service ID of the point-to-multipoint service. Preferably, the status information further includes a type of radio bearer established by the second controller for providing the point-to-multipoint service.

It is contemplated that the processor is further adapted to receive the status information and establish a channel to provide the point-to-multipoint service to the at least one mobile communication terminal when the at least one mobile communication terminal is the first of a plurality of terminals that moves to the area controlled by a second controller and establish a channel to provide the point-to-multipoint service to the at least one mobile communication terminal without receiving the status information when the at least one mobile communication terminal is not the first of the plurality of terminals that moves to the area controlled by the second controller.

In another aspect of the present invention, a network controller for providing a point-to-multipoint service to at least one mobile communication terminal in a radio communications system when the terminal moves from an area controlled by a second controller to an area controlled by the network controller is provided. The network controller includes a transmitter adapted to transmit signals including status information to the second controller, a receiver adapted to receive signals including the point-to-multipoint service from the second controller and a processor adapted to generate the status information including information related to the point-to-multipoint service and either receive a channel from the second controller to transmit the point-to-multipoint service to the at least one mobile communication terminal or assume control of the at least one mobile communication terminal.

It is contemplated that the point-to-multipoint service is a Multimedia Broadcast/Multicast Service (MBMS). Preferably, the channel received to transmit the point-to-multipoint service to the at least one mobile communication terminal is a dedicated channel.

It is contemplated that the network controller is a drift radio network controller (DRNC). Preferably, the processor is further adapted to transmit the status information to the second controller and at least a third controller, the third controller adjacent to the network controller.

It is contemplated that the processor is further adapted to generate either an MBMS connection message, a channel type reconfiguration message, a radio link setup message, a radio link reconfiguration message or an RRC signaling message including the status information. Preferably, the processor is further adapted to generate the status information including a service ID of the point-to-multipoint service.

It is contemplated that the processor is further adapted to determine that the service ID does not correspond to a service predetermined as provided via a dedicated channel and generate the status information including a type of radio bearer established for providing the point-to-multipoint service. Preferably, the processor is further adapted to transmit the status information when the at least one mobile communication terminal is the first of a plurality of terminals that moves from the area controlled by a second controller and not transmit the status information when the at least one mobile communication terminal is not the first of the plurality of terminals that moves from the area controlled by a second controller.

In another aspect of the present invention, a mobile communication terminal for receiving a point-to-multipoint service in a mobile communications system when the terminal moves from a first area controlled by a first controller to a second area controlled by a second controller is provided. The mobile communication terminal includes an antenna adapted to receive RF signals including the point-to-multipoint service and to transmit RF signals including status information, an RF module adapted to process the RF signals received by the antenna, a keypad adapted for inputting information from a user, a storage unit adapted to store information related to the point-to-multipoint service, a display adapted to convey information to the user and a processing unit adapted to generate the status information including information related to the point-to-multipoint service and receive the point-to-multipoint service.

It is contemplated that the point-to-multipoint service is a Multimedia Broadcast/Multicast Service (MBMS). It is further contemplated that the processing unit is further adapted to determine that the point-to-multipoint service is provided via a dedicated channel by the second controller, set a timer and either terminate the timer upon receiving the point-to-multipoint service or transmit the status information upon expiration of the timer. Preferably, the processing unit is further adapted to transmit the status information when the mobile communication terminal is the first of a plurality of terminals that moves from the first area to the second area and not transmit the status information when the mobile communication terminal is not the first of the plurality of terminals that moves from the first area to the second area.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to an apparatus and method for transmitting information for supporting mobility of a terminal and providing an MBMS. Although the present invention is illustrated with respect to a mobile terminal, it is contemplated that the present invention may be utilized anytime it is desired to enable a mobile communication device to receive an MBMS when moving from one area to another.

Reference will now be made in detail to the preferred embodiments of the present invention, examples of which are illustrated in the accompanying drawings. The present invention may be implemented in a mobile communication system such as a Universal Mobile Telecommunications System (UMTS) developed by the 3GPP. However, the present invention may be applied to communications system operated according to other specifications.

The present invention is designed to solve problems that may occur when a system supports mobility of a terminal 1 and efficiently uses radio resources so as to desirably provide services to the terminal. The present invention proposes a communications system in which a first system notifies a second system managing terminals 1 of a status of a specific service or services. Specifically, the present invention proposes a radio communication system for a multimedia broadcast/multicast service (MBMS) in which a DRNC 5 or a terminal 1 informs the SRNC of information related to a service status in radio communications system for transmitting an MBMS to a plurality of terminals through a downlink channel.

In one aspect of the present invention, the SRNC 5 is informed of the status of the MBMS to which a terminal 1 has subscribed, such that the terminal can receive the MBMS using a dedicated channel. Preferably, the MBMS status information (MBMS state information) may be an MBMS and a type of radio bearer (RB) providing the corresponding MBMS. The MBMS status information can be transmitted through an MBMS connection or attachment message, channel type reconfiguration message, radio link setup message, radio link reconfiguration message or RRC signaling message. Different methods may address two conditions according to the state of the SRNC 5.

The first condition occurs when the SRNC 5 does not support a specific MBMS. Therefore, a terminal 1 may not receive the specific MBMS from the SRNC. Accordingly, if the terminal 1 has moved from an area controlled by the SRNC 5 to an area controlled by a DRNC that provides the specific MBMS, the terminal may operate to receive the MBMS according to the type of Radio Bearers (RBs).

When the DRNC 5 provides the MBMS using a point-to-multipoint RB, the terminal 1 receives MBMS data transmitted from the Core Network (CN) 3 via the DRNC using the point-to-multipoint RB without considering whether the MBMS is supported by the SRNC. Conversely, if the DRNC 5 provides the MBMS using a point-to-point RB, the terminal 1 should receive the MBMS via the DRNC after setting a dedicated channel with the SRNC.

However, the SRNC 5 cannot accurately recognize the status of the MBMS provided from the DRNC and it is impossible for the SRNC to set the dedicated channel with the terminal 1. Therefore, in order to inform the SRNC 5 of the MBMS status information (MBMS state information), the DRNC or the terminal 1 is allowed to transmit to the SRNC the MBMS status information to which the terminal has subscribed.

The SRNC 5, having received the MBMS state information, should set the dedicated channel with the terminal 1 so that the terminal is allowed to receive the MBMS. However, the current SRNC 5 does not support the MBMS and, therefore, initiates an SRNS relocation process. The MBMS state information may be used as an indicator for initiating the SRNC relocation.

The second condition occurs when the SRNC 5 supports a specific MBMS and the terminal 1 receives the MBMS. When the terminal 1 has moved from an area controlled by the SRNC 5 to an area controlled by a DRNC that provides the MBMS, the terminal can operate to receive the MBMS according to the type of RBs provided.

When the DRNC 5 provides the MBMS using a point-to-multipoint RB, the terminal 1 receives MBMS data transmitted from the CN 3 via the DRNC using the point-to-multipoint RB regardless of the type of RBs provided from the SRNC. Conversely, when the DRNC 5 provides the MBMS using the point-to-point RB, the terminal 1 should receive the MBMS via the DRNC after setting the dedicated channel with the SRNC.

However, the SRNC 5 cannot accurately recognize the status of the MBMS provided from the DRNC and it is impossible for the SRNC to set the dedicated channel with the terminal 1. In order to inform the SRNC 5 of the MBMS status information, the DRNC or the terminal 1 also transmits to the SRNC the status information of the MBMS to which the terminal has subscribed. The SRNC 5, having received the MBMS state information, allows the terminal 1 to receive the MBMS by setting a dedicated channel with the terminal.

Operation of a system will now be described in which it is assumed that the DRNC 5 informs the SRNC that a point-to-multipoint RB for providing the specific MBMS, initially set in the DRNC, is changed to point-to-point. The SRNC 5 uses a point-to-point RB for providing the MBMS in the DRNC.

When a terminal 1 has moved from an area controlled by a specific SRNC 5 to an area controlled by a specific DRNC, the SRNC cannot recognize that the DRNC uses a point-to-point RB to provide the MBMS if the terminal is the first terminal that moves from the area controlled by the specific SRNC to the area controlled by the specific DRNC. Accordingly, the terminal 1 or the DRNC 5 should transmit to the SRNC the status information of the MBMS provided by the DRNC to which the terminal has subscribed. The SRNC 5, having received the MBMS status information, provides the MBMS to the terminal 1 by setting a dedicated channel with the terminal. Even when the DRNC 5 transmits a terminal-related MBMS using the point-to-multipoint RB, the terminal 1 or the DRNC can transmit the MBMS status information to the SRNC.

Figure 6:
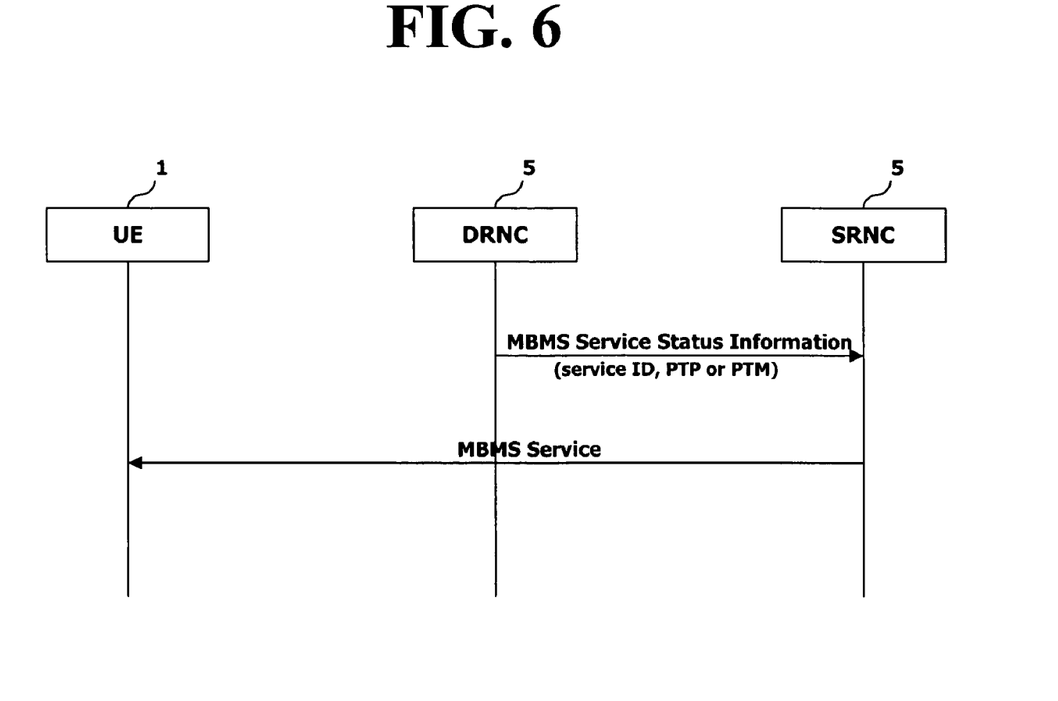
FIG. 6 illustrates a first embodiment of a method for transmitting MBMS information according to the present invention.

FIG. 6 illustrates a first embodiment for transmitting MBMS information according to the present invention. As illustrated in FIG. 6, the DRNC 5 transmits MBMS status information to the SRNC. The MBMS status information refers to information for a terminal-related MBMS provided by the DRNC and information for the type of RB providing the MBMS.

The MBMS status information may be used as an indicator that the MBMS is provided using the point-to-point RB. At this time, the information for the type of the RB is not included therein. The SRNC 5, having received the MBMS status information, sets the dedicated channel with the terminal 1 and transmits the MBMS to the terminal via the DRNC. The MBMS status information can be transmitted through an MBMS attachment or connection message, channel type reconfiguration message, radio link setup message or radio link reconfiguration message.

Figure 7:
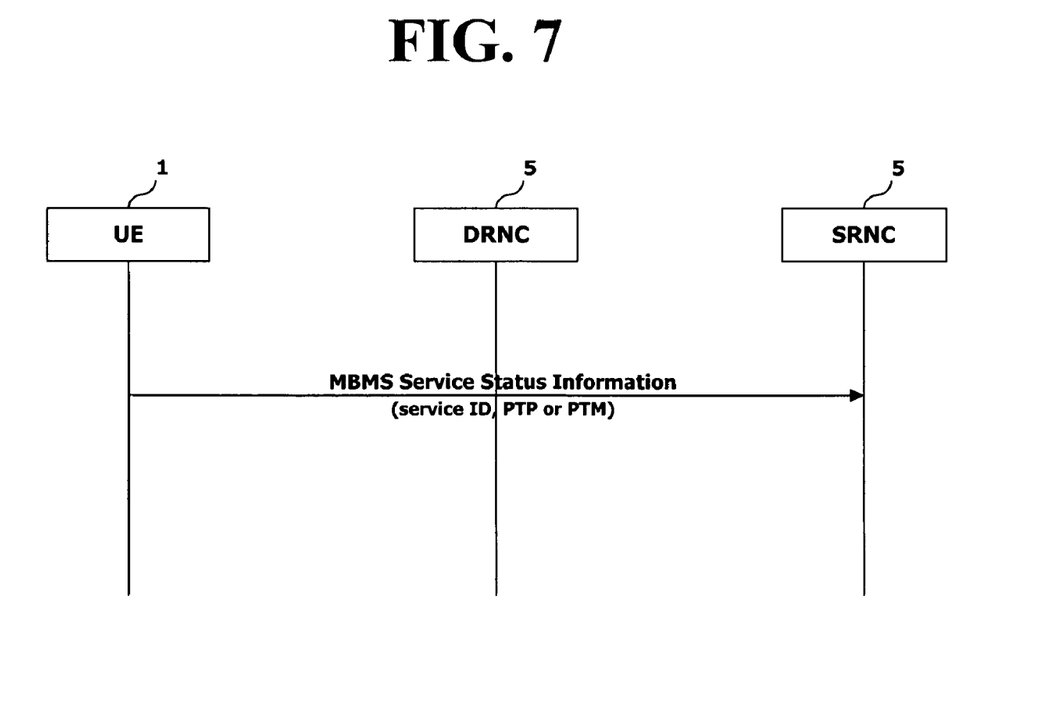
FIG. 7 illustrates a second embodiment of a method for transmitting MBMS information according to the present invention.

FIG. 7 illustrates a second embodiment for transmitting MBMS information according to the present invention. As illustrated in FIG. 7, the terminal 1, having moved to an area controlled by the DRNC 5, transmits the MBMS status information to the SRNC. Similar to the first embodiment, the MBMS status information refers to terminal-related MBMS information that the DRNC 5 provides and information for the type of RB providing the MBMS.

As in the first embodiment, the MBMS status information can be used as an indicator that the MBMS is provided using the point-to-point RB. The MBMS status information does not include the information of the type of the RB. The SRNC 5, having received the MBMS status information, sets the dedicated channel with the terminal 1 and transmits the MBMS to the terminal via the DRNC. The MBMS status information can be transmitted through an RRC message or through an RRC signaling message.

The terminal 1 can set a specified timer for transmitting the MBMS status information to the SRNC 5 after confirming that the related MBMS is being provided by the DRNC using the point-to-point RB. Specifically, when the terminal 1 confirms that the DRNC 5 is providing the terminal-related MBMS using the point-to-point RB, the terminal enables the timer. When the MBMS is received while the timer is enabled, the terminal 1 disables the timer. If the timer expires before the MBMS is received, the terminal 1 transmits the MBMS status information to the SRNC 5 to inform the SRNC that the MBMS is being provided using the point-to-point RB. The SRNC 5 sets the dedicated channel with the terminal 1 in order to inform the terminal that the service should be provided.

Figure 8:
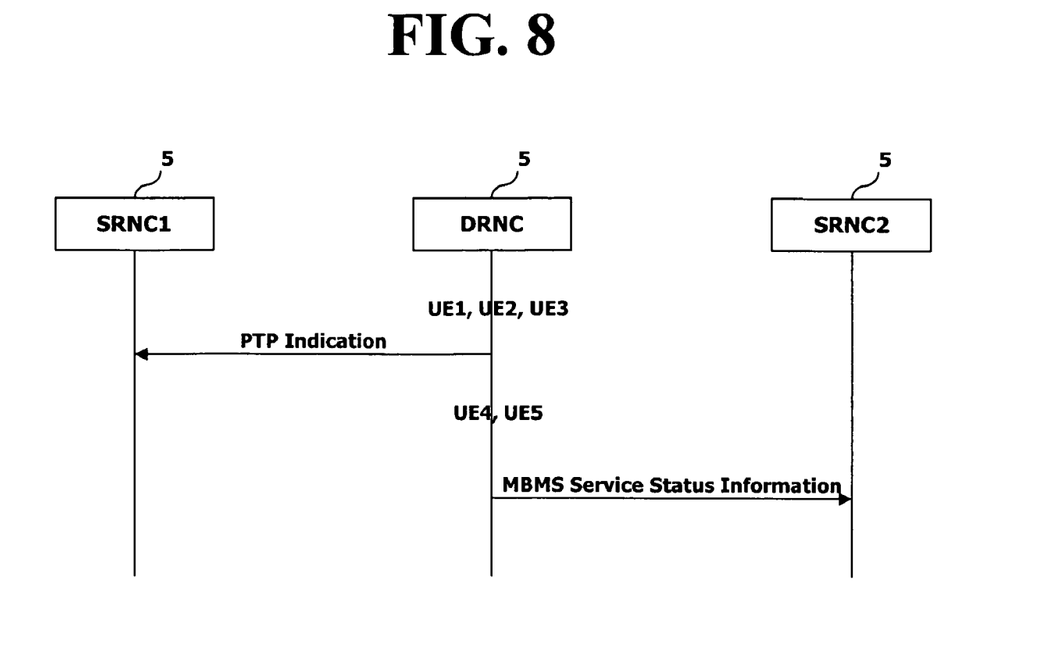
FIG. 8 illustrates a third embodiment of a method for transmitting MBMS information according to the present invention.

FIG. 8 illustrates a third embodiment for transmitting MBMS information according to the present invention. As illustrated in FIG. 8, it is assumed that the DRNC 5 informs SRNC1 that the RB for providing a specific MBMS is initially set as point-to-point or is varied from point-to-multipoint to point-to-point. Until information with respect to the point-to-point RB setup or the varying or the point-to-multipoint setup is received from the DRNC 5, SRNC1 uses a point-to-multipoint RB as the RB for providing the MBMS.

As illustrated, UE1, UE2 and UE3 are controlled by SRNC1. SRNC1 recognizes that the MBMS is provided using the point-to-point RB. Accordingly, when UE4 has moved to the area controlled by the DRNC 5, SRNC1 already knows that the DRNC 5 is providing the MBMS using a point-to-point RB. Therefore, SRNC1 can provide the MBMS to UE4 by setting the dedicated channel with UE4.

However, when UE5, under control of SRNC2, has moved to the area controlled by the DRNC 5, UE5 is the first terminal moving from the area controlled by SRNC2 to the area controlled by the DRNC. Accordingly, SRNC2 cannot recognize that the DRNC 5 is providing the MBMS using a point-to-point RB. Therefore, the UE5 or the DRNC 5 transmits the MBMS status information to SRNC2 in order to inform SRNC2 that the MBMS is provided using a point-to-point RB. As a result, SRNC2 sets the dedicated channel with UE5 in order to provide the MBMS to UE5. Also in the present invention, the DRNC 5 allows transmitting of the MBMS status information to every RNC adjacent thereto, for example, SRNC2.

Figure 9:
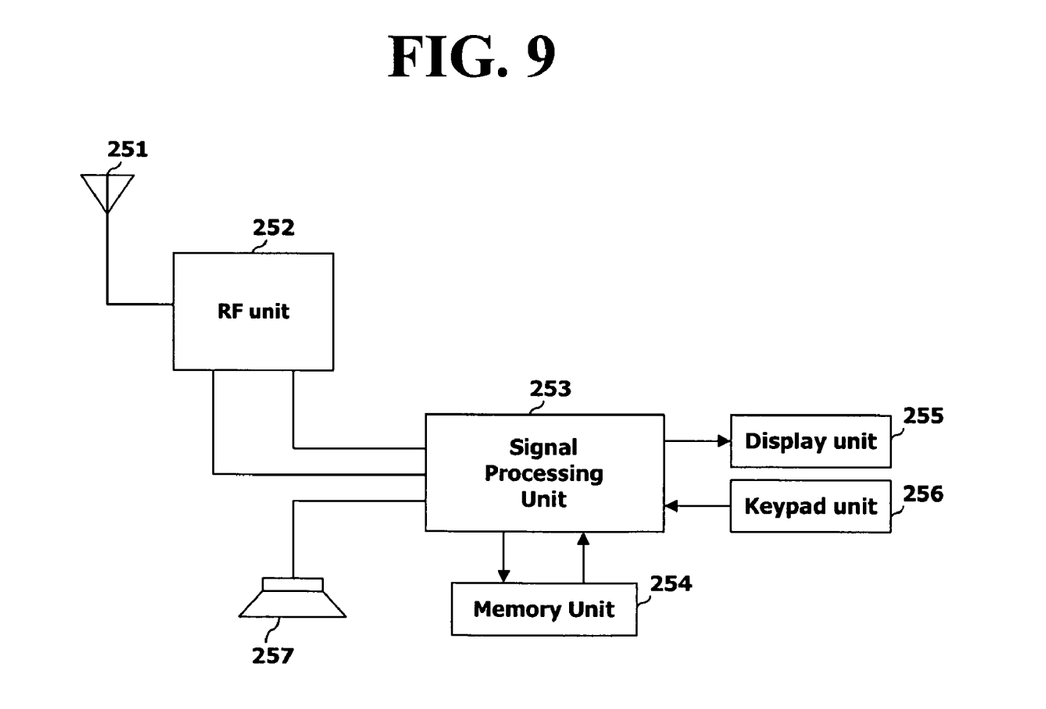
FIG. 9 illustrates a block diagram of a radio communication apparatus according to one embodiment of the present invention.

FIG. 9 illustrates a block diagram of a radio communication apparatus according to one embodiment of the present invention. A radio communication apparatus according to the present invention includes an antenna unit 251, an RF (radio frequency) unit 252, a signal processing unit 253 and a memory unit 254.

The signal processing unit 253 includes a processing unit such as a microprocessor and a digital processor. The radio communication apparatus according to the present invention further includes a display unit 255 for displaying specific information on a screen, a keypad unit 256 for receiving a signal from a user, and a speaker unit 257 for outputting a sound signal. The signal processing unit 253 is adapted to perform the methods disclosed herein in order to support mobility of a terminal and provide an MBMS.

In the conventional methods, an SRNC could not recognize which RB a DRNC uses to transmit a terminal-related MBMS. Accordingly, when the DRNC is providing a specific MBMS using a point-to-point RB, the SRNC cannot set a dedicated channel with the terminal and, therefore, cannot provide the MBMS. In the present invention, when a terminal has moved to an area controlled by a DRNC, the DRNC or the terminal transmits to the SRNC the status information of the terminal-related MBMS that the DRNC is providing. As a result, the SRNC can set a dedicated channel with the terminal at an accurate time point, thereby allowing the terminal to receive the MBMS.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims. The foregoing embodiments and advantages are merely exemplary and are not to be construed as limiting the present invention. In the claims, means-plus-function clauses are intended to cover the structure described herein as performing the recited function and not only structural equivalents but also equivalent structures.

What is claimed is:

1. A method for providing a point-to-multipoint service to at least one mobile communication terminal in a mobile communications system when the terminal moves from a first area controlled by a first controller to a second area controlled by a second controller, the method comprising:

the second controller transmitting status information to the first controller, the status information related to the point-to-multipoint service provided by the second controller and comprising a service ID of the point-to-multipoint service;

the first controller either establishing a channel to transmit the point-to-multipoint service to the at least one mobile communication terminal or initiating a relocation of the control of the at least one mobile communication terminal to the second controller; and the second controller determining that the service ID does not correspond to a service predetermined as provided via a dedicated channel and transmitting the status information comprising a type of radio bearer established for providing the point-to-multipoint service.

2. The method of claim 1, wherein the point-to-multipoint service is a Multimedia Broadcast/Multicast Service (MBMS).

3. The method of claim 1, wherein the channel established by the first controller to transmit the point-to-multipoint service to the at least one mobile communication terminal is a dedicated channel.

4. The method of claim 1, wherein the first controller is a serving radio network controller (SRNC) and the second controller is a drift radio network controller (DRNC).

5. The method of claim 1, wherein the first controller establishes a channel to transmit the point-to-multipoint service to the at least one mobile communication terminal if the first controller supports the point-to-multipoint service.

6. The method of claim 1, wherein the first controller initiates a relocation of the control of the at least one mobile communication terminal to the second controller if the first controller does not support the point-to-multipoint service.

7. The method of claim 1, wherein the mobile communication terminal transmits the status information.

8. The method of claim 7, further comprising;
the mobile communication terminal determining that the point-to-multipoint service is provided via a dedicated channel by the second controller;
the mobile communication setting a timer; and
the mobile communication terminal one of terminating the timer upon receiving the point-to-multipoint service via a channel established by the first controller and transmitting the status information upon expiration of the timer.

9. The method of claim 1, wherein the second controller transmits the status information.

10. The method of claim 9, further comprising the second controller transmitting the status information to at least a third controller in addition to the first controller, the third controller adjacent to the second controller.

11. The method of claim 9, wherein the status information is transmitted via one of an MBMS connection message, a channel type reconfiguration message, a radio link setup message, a radio link reconfiguration message and an RRC signaling message.

12. A method for providing a point-to-multipoint service to at least one mobile communication terminal in a radio communications system when the terminal moves from a first area controlled by a first controller to a second area controlled by a second controller, the method comprising:
the first controller receiving status information related to the point-to-multipoint service provided by the second controller, the status information transmitted by the second controller and comprising a service ID of the point-to-multipoint service;
the first controller either establishing a channel to transmit the point-to-multipoint service to the at least one mobile communication terminal or initiating a relocation of the control of the at least one mobile communication terminal to the second controller; and
the second controller determining that the service ID does not correspond to a service predetermined as provided via a dedicated channel and transmitting the status information comprising a type of radio bearer established for providing the point-to-multipoint service.

13. The method of claim 12, wherein the point-to-multipoint service is a Multimedia Broadcast/Multicast Service (MBMS).

14. The method of claim 12, wherein the channel established to transmit the point-to-multipoint service to the at least one mobile communication terminal is a dedicated channel.

15. The method of claim 12, wherein the first controller is a serving radio network controller (SRNC).

16. The method of claim 12, wherein a channel is established to provide the point-to-multipoint service if the point-to-multipoint service is supported.

17. The method of claim 12, wherein a relocation of the control of the at least one mobile communication terminal to the second controller is initiated if the point-to-multipoint service is not supported.

18. The method of claim 12, wherein receiving the status information comprises receiving one of an MBMS connection message, a channel type reconfiguration message, a radio link setup message, a radio link reconfiguration message and an RRC signaling message.

19. The method of claim 12, wherein the status information further comprises a type of radio bearer established by the second controller for providing the point-to-multipoint service.

20. A method for providing a point-to-multipoint service to at least one mobile communication terminal in a mobile communications system when the terminal moves from a first area controlled by a first controller to a second area controlled by a second controller, the method comprising:
transmitting status information related to the point-to-multipoint service provided;
receiving a channel from the first controller to transmit the point-to-multipoint service to the at least one mobile communication terminal; and
assuming control of the at least one mobile communication terminal,
wherein transmitting the status information comprises transmitting a service ID of the point-to-multipoint service, determining that the service ID does not correspond to a service predetermined as provided via a dedicated channel and transmitting the status information comprising a type of radio bearer established for providing the point-to-multipoint service.

21. The method of claim 20, wherein the point-to-multipoint service is a Multimedia Broadcast/Multicast Service (MBMS).

22. The method of claim 20, wherein the channel received to transmit the point-to-multipoint service to the at least one mobile communication terminal is a dedicated channel.

23. The method of claim 20, wherein the second controller is a drift radio network controller (DRNC).

24. The method of claim 20, further comprising transmitting the status information to the first controller and at least a third controller, the third controller adjacent to the second controller.

25. The method of claim 20, wherein transmitting the status information comprises transmitting one of an MBMS connection message, a channel type reconfiguration message, a radio link setup message, a radio link reconfiguration message and an RRC signaling message.

26. A network controller for providing a point-to-multipoint service to at least one mobile communication terminal in a radio communications system when the terminal moves from an area controlled by the network controller to an area controlled by a second controller, the network controller comprising:
a transmitter adapted to transmit signals comprising the point-to-multipoint service to the at least one mobile communication terminal;
a receiver adapted to receive signals comprising status information related to the point-to-multipoint service provided by the second controller; and
a processor adapted to process the status information and either establish a channel to transmit the point-to-multipoint service to the at least one mobile communication terminal or initiate a relocation of the control of the at least one mobile communication terminal to the second controller,
wherein the processor receives the status information and establishes a channel to provide the point-to-multipoint service to the at least one mobile communication terminal when the at least one mobile communication terminal is the first of a plurality of terminals that moves to the area controlled by a second controller and establishes a channel to provide the point-to-multipoint service to the at least one mobile communication terminal without receiving the status information when the at least one mobile communication terminal is not the first of the plurality of terminals that moves to the area controlled by the second controller.

27. The network controller of claim 26, wherein the point-to-multipoint service is a Multimedia Broadcast/Multicast Service (MBMS).

28. The network controller of claim 26, wherein the channel established to transmit the point-to-multipoint service to the at least one mobile communication terminal is a dedicated channel.

29. The network controller of claim 26, wherein the network controller is a serving radio network controller (SRNC).

30. The network controller of claim 26, wherein the processor is further adapted to establish a channel to provide the point-to-multipoint service if the point-to-multipoint service is supported.

31. The network controller of claim 26, wherein the processor is further adapted to initiate a relocation of the control of the at least one mobile communication terminal to the second controller if the point-to-multipoint service is not supported.

32. The network controller of claim 26, wherein the processor is further adapted to process one of an MBMS connection message, a channel type reconfiguration message, a radio link setup message, a radio link reconfiguration message and an RRC signaling message comprising the status information.

33. The network controller of claim 26, wherein the status information comprises a service ID of the point-to-multipoint service.

34. The network controller of claim 33, wherein the status information further comprises a type of radio bearer established by the second controller for providing the point-to-multipoint service.

35. A network controller for providing a point-to-multipoint service to at least one mobile communication terminal in a radio communications system when the terminal moves from an area controlled by a second controller to an area controlled by the network controller, the network controller comprising:
a transmitter adapted to transmit signals comprising status information to the second controller;
a receiver adapted to receive signals comprising the point-to-multipoint service from the second controller; and
a processor adapted to generate the status information comprising information related to the point-to-multipoint service and either receive a channel from the second controller to transmit the point-to-multipoint service to the at least one mobile communication terminal or assume control of the at least one mobile communication terminal,
wherein the processor transmits the status information when the at least one mobile communication terminal is the first of a plurality of terminals that moves from the area controlled by a second controller and does not transmit the status information when the at least one mobile communication terminal is not the first of the plurality of terminals that moves from the area controlled by a second controller.

36. The network controller of claim 35, wherein the point-to-multipoint service is a Multimedia Broadcast/Multicast Service (MBMS).

37. The network controller of claim 35, wherein the channel received to transmit the point-to-multipoint service to the at least one mobile communication terminal is a dedicated channel.

38. The network controller of claim 35, wherein the network controller is a drift radio network controller (DRNC).

39. The network controller of claim 35, wherein the processor is further adapted to transmit the status information to the second controller and at least a third controller, the third controller adjacent to the network controller.

40. The network controller of claim 35, wherein the processor is further adapted to generate one of an MBMS connection message, a channel type reconfiguration message, a radio link setup message, a radio link reconfiguration message and an RRC signaling message comprising the status information.

41. The network controller of claim 35, wherein the processor is further adapted to generate the status information comprising a service ID of the point-to-multipoint service.

42. The network controller of claim 41, wherein the processor is further adapted to:
determine that the service ID does not correspond to a service predetermined as provided via a dedicated channel; and
generate the status information comprising a type of radio bearer established for providing the point-to-multipoint service.

43. A mobile communication terminal for receiving a point-to-multipoint service in a mobile communications system when the terminal moves from a first area controlled by a first controller to a second area controlled by a second controller, the mobile communication terminal comprising:
an antenna adapted to receive RF signals comprising the point-to-multipoint service and to transmit RF signals comprising status information;
an RF module adapted to process the RF signals received by the antenna
a keypad adapted for inputting information from a user;
a storage unit adapted to store information related to the point-to-multipoint service;
a display adapted to convey information to the user; and
a processing unit adapted to generate the status information comprising information related to the point-to-multipoint service and receive the point-to-multipoint service,
wherein the processing unit transmits the status information when the mobile communication terminal is the first of a plurality of terminals that moves from the first area to the second area and does not transmit the status information when the mobile communication terminal is not the first of the plurality of terminals that moves from the first area to the second area.

44. The mobile communication terminal of claim 43, wherein the point-to-multipoint service is a Multimedia Broadcast/Multicast Service (MBMS).

45. The mobile communication terminal of claim 43, wherein the processing unit is further adapted to:
determine that the point-to-multipoint service is provided via a dedicated channel by the first controller;
set a timer; and
one of terminate the timer upon receiving the point-to-multipoint service and transmit the status information upon expiration of the timer.

* * * * *